(12) United States Patent
Shaw

(10) Patent No.: US 7,416,166 B1
(45) Date of Patent: Aug. 26, 2008

(54) MULTI-LEVEL INTERLOCKING BLOCKS

(76) Inventor: Anne Shaw, 19223 E. Colima Rd., #937, Rowland Heights, CA (US) 91748

( * ) Notice: Subject to any disclaimer, the term of this patent is extended or adjusted under 35 U.S.C. 154(b) by 0 days.

(21) Appl. No.: 11/728,925

(22) Filed: Mar. 27, 2007

(51) Int. Cl.
    *E02C 3/00* (2006.01)
(52) U.S. Cl. .............................. 254/88; 52/604; 446/128
(58) Field of Classification Search .................. 52/578,
    52/309.1, 503, 505, 574, 592.6, 604; 254/88;
    152/213 R; 238/14; 248/352; 269/289 R,
    269/296; 446/124, 125, 128; D34/38; D21/484,
    D21/491, 500
    See application file for complete search history.

(56) References Cited

U.S. PATENT DOCUMENTS

| | | | | |
|---|---|---|---|---|
| 3,162,973 A | * | 12/1964 | Christiansen | ............... 446/128 |
| 3,487,579 A | * | 1/1970 | Brettingen | ................... 446/128 |
| 5,458,315 A | | 10/1995 | Blatz et al. | |
| D426,933 S | | 6/2000 | Redfern | |
| 7,040,603 B1 | | 5/2006 | Tai et al. | |

* cited by examiner

*Primary Examiner*—Robert Canfield
*Assistant Examiner*—Bryan Eppes

(57) ABSTRACT

The present invention is a unitary piece block formed of polymers (such as polystyrene or other high strength polymer) by a single injection molding step which are assembled into a recreational vehicle leveler. The invention ramp provides four sets of four connectors at a top of a floor plate, which are adapted to interlock in cavity structures formed within a cavity on the underside of the block. Two adjacent blocks are secured together by applying to their top surfaces the securing cavity structure of an underside of a third such block. Such blocks can be stacked in an interlocking manner to reduce storage space.

5 Claims, 5 Drawing Sheets

MULTI-LEVEL INTERLOCKING BLOCKS

FIELD OF THE INVENTION

The present invention relates to devices used to level recreational vehicles and travel trailers. More specifically, the present invention relates to plastic interlocking blocks used to level recreational vehicles and travel trailers.

BACKGROUND OF THE INVENTION

The prior art describes several forms of interlocking pieces connected so that trucks and recreational vehicles can drive on to them and be leveled at an uneven site.

US Patent D426,933 shows one of a set of at least three interlocking blocks that are set up with two side by side and the third placed on top of halves of the bottom two to lock the three together. It has been found that this form of interlocking block suffers from substantial (over 20%) breakage in actual use with loaded trucks and recreational vehicles. The breakage is due to the particular strains placed on the blocks. A tire must be able to drive up a stepped ramp formed by the blocks and then come to rest preferably at the top of the third or top block or at any place on the stepped ramp. The strain that this makes on plastic pieces has been found to be unique in engineering of plastic parts.

U.S. Pat. No. 5,458,315 attempts to solve this breakage problem by using a heavily reinforced skeleton of brace plates. While in some ways preferable over the device of US Patent D426,933, the polygonal form of the raised part to interlock with a cavity in another block allows substantial lateral twisting that is not allowed with the square raised part shown in US Patent D426,933.

U.S. Pat. No. 7,040,603 shows that, for an interlocking type of ramp piece, from a floor plane level four square upward extensions are formed with four "key recesses" cavities formed therein. The underside of the each piece is formed to receive and interlock with the upward extensions.

There is a need for a device that would combine the non-rotation form of a leveling block with an improved non-breakable form.

SUMMARY OF THE INVENTION

The present invention is a set of at least three interlocking blocks where two of the blocks are set adjacent on a ground surface and are connected at their top surfaces by a particular configuration of the underside of the third block. Other blocks are capable being set adjacent to the ones on the ground surface and interlocked by stacking additional blocks between them to form a leveling device for recreational vehicles.

The present invention is formed of individual unitary interlocking blocks formed of polymers (such as polyethylene, polypropylene, polystyrene or other high strength polymer) by a single injection molding step. Each block comprises a square floor plate whose from periphery extends uniformly downward to a first height an outer sidewall, thereby forming a underside cavity and whereby a lower rim of the outer sidewall defines a ground plane level. Extending down from an underside of the floor plate to the ground plane in a central portion of the square floor plate are four central support sidewalls forming a central support square and defining a central underside cavity where each vertex of central support square is directed at an inner midpoint of one of the outer sidewalls. The underside cavity is further divided by a paired sets of support flanges which extend from said midpoints to vertices of said central support square, further thereby defining four equal sized and generally square receiving cavities. Each paired set of support flanges extends from an underside of the floor plate to the ground plane level and is bisected by a square cross-section side peripheral support extending down from the floor plate to the ground plane. Two opposite vertices of each side peripheral support are connected with one of the support flanges.

Sixteen octagonal flat-topped connectors extend up from the floor plate and each define a central pin bore extending from a top opening to a closed end at the floor plate. Said connectors collectively define eight top peripheral square receiving cavities and one top central square receiving cavity. The sixteen connectors are divided into four connector sets, each connector set having four octagonal connectors linked by low projections from the floor plate, each set being generally square and arranged at one of four corner portions of the top of the floor plate. Opposing and center facing sides of the octagonal connectors are parallel, thereby defining in a central part of the connector set a square corner peripheral receiving cavity. A square opening is defined in the floor plate at a bottom of each corner peripheral receiving cavity from which extends down to the ground plane four walls which end in a bottom plate, the combination of the four walls and bottom plate thereby forming square cross-section corner peripheral support.

Opposing and center facing sides of the four central-most connectors of the four connector sets are parallel and define a square central receiving cavity. The opposing sides of the four central-most connectors of the four connector sets are parallel and define a square central receiving cavity.

Opposing and center facing sides of the four connectors of two adjacent connector sets are parallel and define a square side peripheral receiving cavity. Opposing sides of the four connectors of the four connector sets are parallel and define a square central receiving cavity. A square opening is defined in the floor plate at a bottom of each side peripheral receiving cavity from which extends down to the ground plane four walls which end in a bottom plate, the combination of the four walls and bottom plate thereby forming the square cross-section side peripheral support.

Each connector defines a central cylindrical bore extending from a top opening to the floor plate. From the underside of the floor plate of said bore's floor plate extends a cylinder to the ground plane, said cylinder having a diameter less than the diameter of said central cylindrical bore.

The underside cavity beneath the floor plate comprises bridge flanges connecting sides of all the downward extensions from the floor plate. Said bridge flanges extend from the underside of the floor plate to a depth of one half or less of the distance from the underside of the floor plate to the ground plane.

Relative to any edge of a first block, in a horizontal direction across the floor plate and normal to said edge, first, second and third rows of four connectors each are adapted, respectively, to engage and interlock a first, second or third row of cavities underneath a second block. A user is thereby capable to forming a steeper or less steep effective ramp grade when said blocks are connected in an assembly of three or more blocks for use in leveling a recreational vehicle.

In using an assembly of three said blocks, weight of a single wheel portion of a supported vehicle is transmitted onto a top surface of a topmost block, which in turn transmits that force downward in two directions. A first quantity of the downward force is transmitted across the top platform surface to the outer sidewalls of the blocks. A second quantity of the force is transmitted directly downward onto a underlying set of supports. These supports join the sidewalls by way of the underside flanges so that downward force from the top platform surface urges the supports apart, creating a tensioned structure which resists fracture of the floor plate. There is no similar structure to accomplish this effect in prior art leveling ramps.

The force distribution of the present invention ramp is so efficient that the plates of the bridge flanges do not descend all the way from the underside of the floor plate surface to the ground plane. Surprisingly, the overall structure is sufficiently strong to support even the heaviest of recreational vehicles without sagging, cracking or breaking. It is this unique construction that permits the invention ramps to be stacked, using about half the storage volume of a comparable ramp by way of prior art construction.

It is an object of the invention to provide square, relatively low profile, leveler blocks where a first, second or third row of connectors can be engaged, respectively, a first, second or third row of connector cavities which are adapted to interlock by way of square and cylindrical extensions.

DETAILED DESCRIPTION OF THE INVENTION

The invention is now discussed with reference to the figures.

Figure 1:
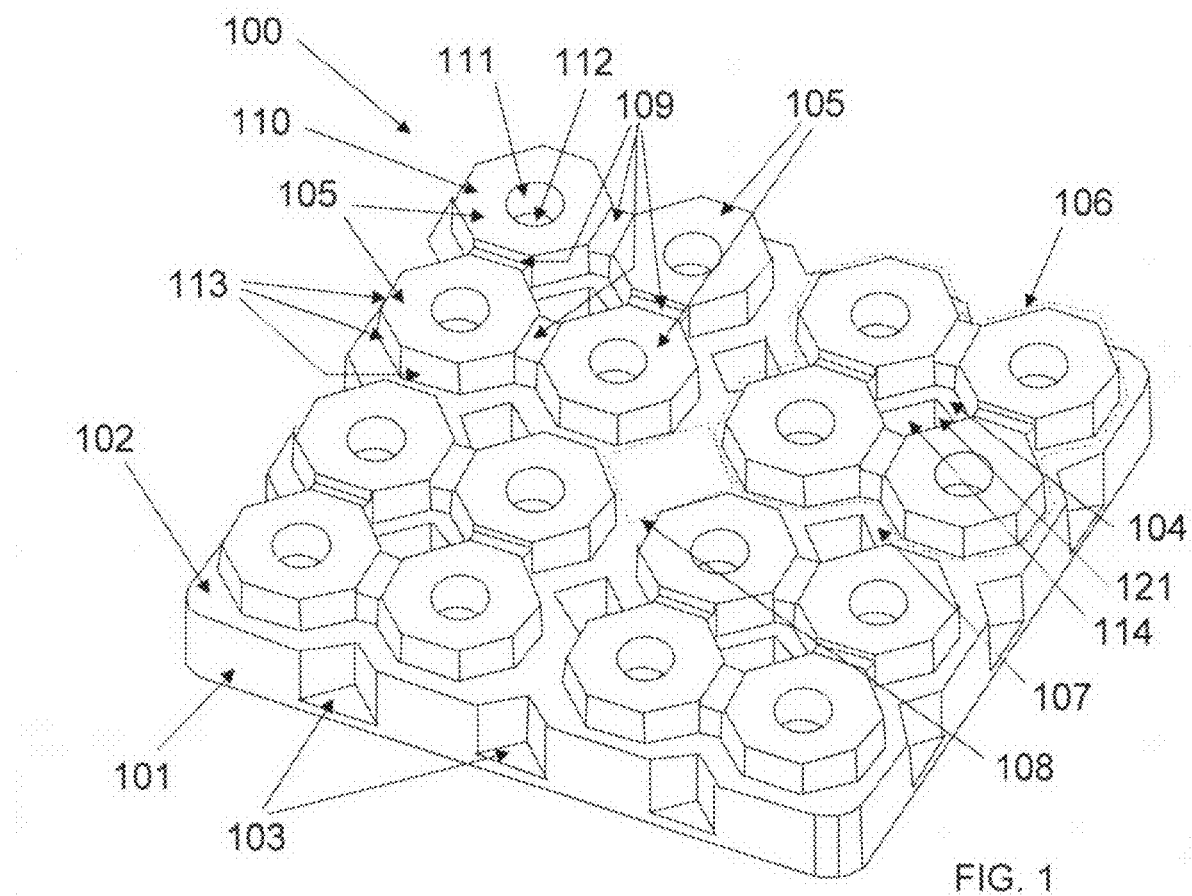
FIG. 1 is a top perspective view of the invention block.

FIG. 1 shows a block 100 having sixteen octagonal flat-topped connectors 105 that extend up from the floor plate 102 and comprise a top surface 110 and vertical sidewalls 113. Each connector 105 a central pin bore having cylinder walls 111 and a closed end 112 at the level of floor plate 102. Said connectors 105 collectively define eight top peripheral square receiving cavities 104 and 107 and one top central square receiving cavity 108. The sixteen connectors 105 are divided into four connector sets 106 (shown in broken lines), each connector set 106 having four octagonal connectors linked by low projections 109 from the floor plate 102, each set being generally square and arranged at one of four corner portions of the top of the floor plate 102. Opposing and center facing sidewalls 113 of the octagonal connectors 105 are parallel, thereby defining in a central part of the connector set a square corner peripheral receiving cavity 104. A square opening is defined in the floor plate at a bottom of each corner peripheral receiving cavity from which extends down to the ground plane four walls 121 which end in a bottom plate 120 (not shown), the combination of the four walls and bottom plate thereby forming square cross-section side peripheral support 114.

Opposing and center facing sidewalls 113 of the four central-most connectors 105 of the four connector sets 106 are parallel and define a square central receiving cavity 108 (shown in broken lines).

Opposing and center facing sides of the four connectors of two adjacent connector sets 106 are parallel and define a square side peripheral receiving cavity 107. A square opening is defined in the floor plate at a bottom of each side peripheral receiving cavity 107 from which extends down to the ground plane four walls which end in a bottom plate (not shown), the combination of the four walls and bottom plate thereby forming square cross-section side peripheral support 114a, which has dimensions identical to those of corner peripheral support 114.

Each connector 105 defines a central cylindrical bore extending from a top opening to the level of the floor plate 102 at closed end 112. From the underside of the closed end 112 and referring now to FIG. 2 extends to the ground plane, a pin cylinder having cylindrical sidewalls 122 and a bore 123 open at a lower end. Cylindrical sidewalls 122 have an outside diameter less than a diameter of said central cylindrical bore of the sidewalls 111 of connectors 105 (as in FIG. 1).

Figure 2:
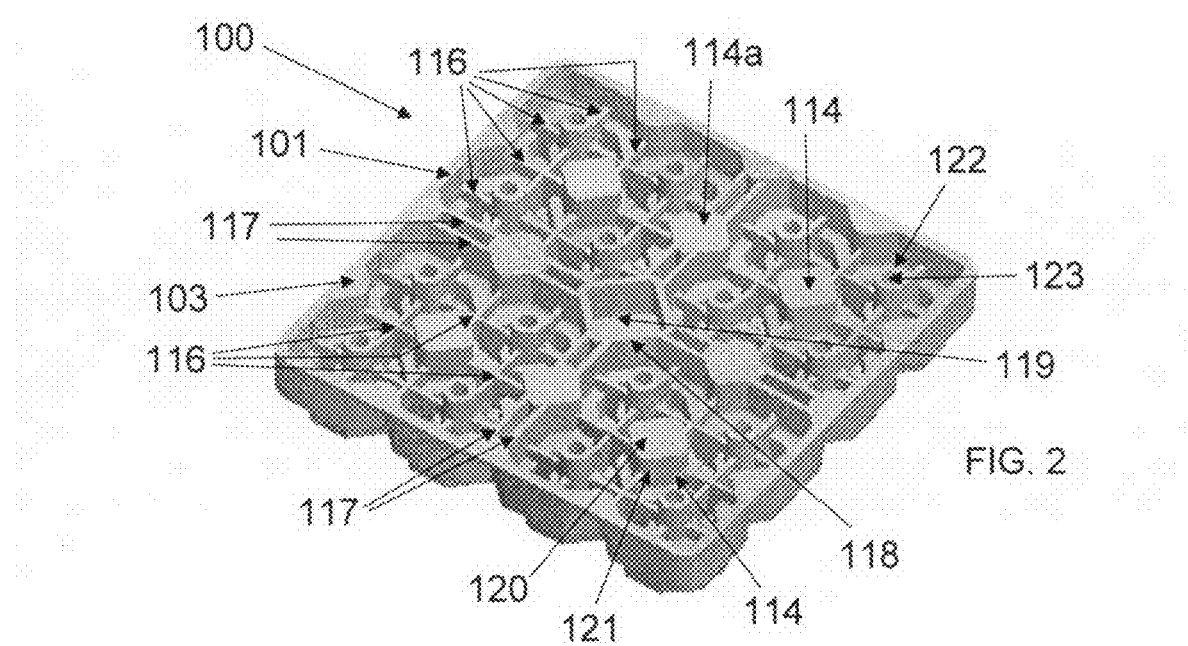
FIG. 2 is a bottom perspective view of the invention block.
Figure 3:
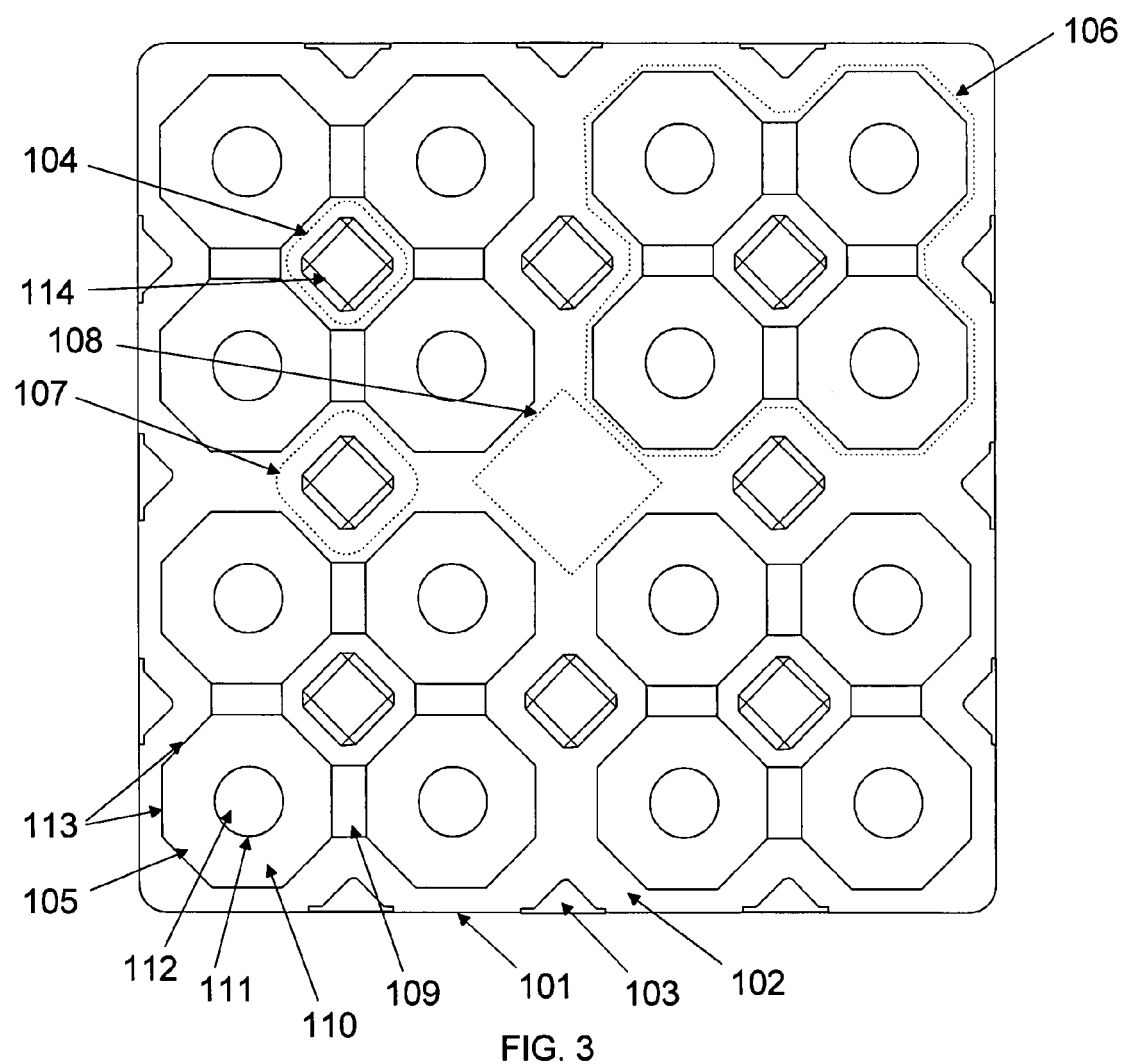
FIG. 3 is a top view of the invention block.
Figure 4:
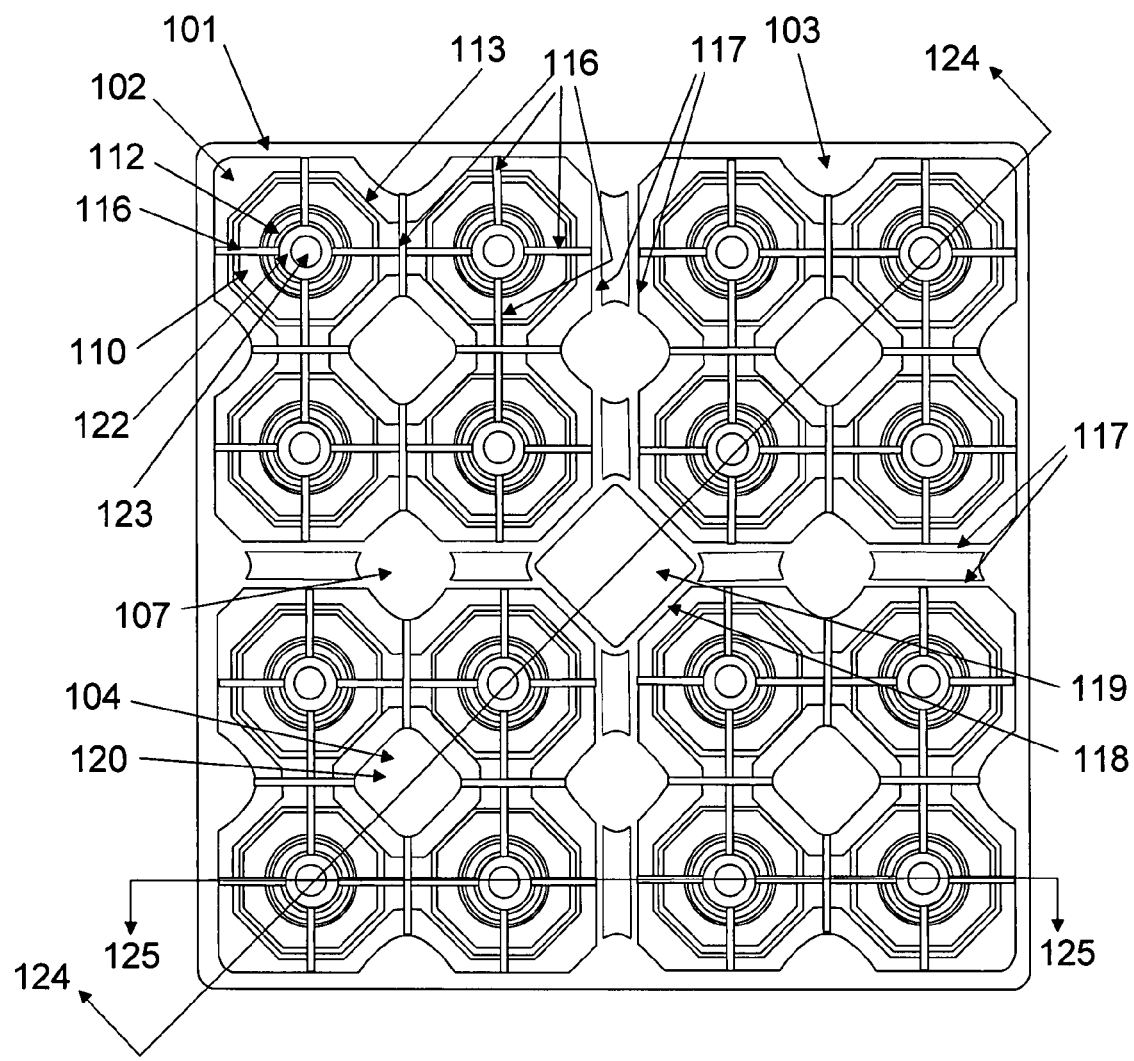
FIG. 4 is a bottom view of the invention block.
Figure 5:
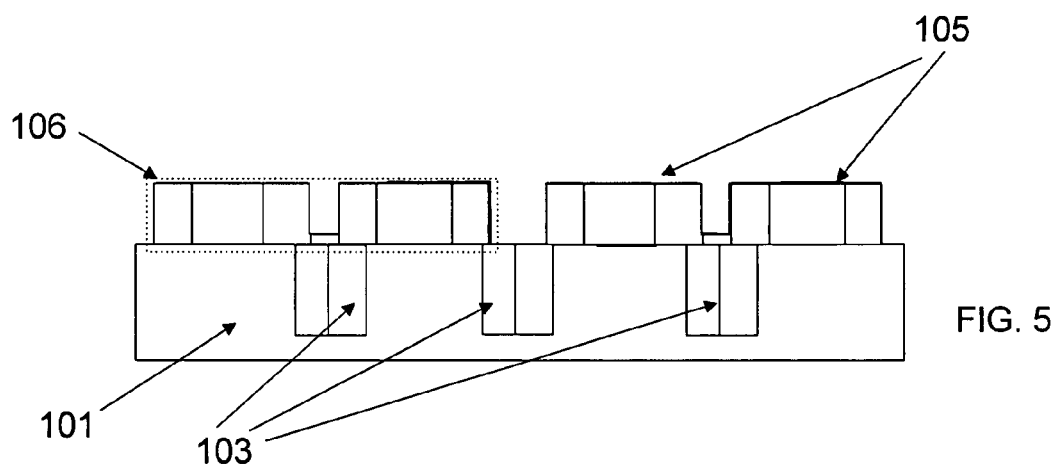
FIG. 5 is a side view of the invention ramp.
Figure 6:
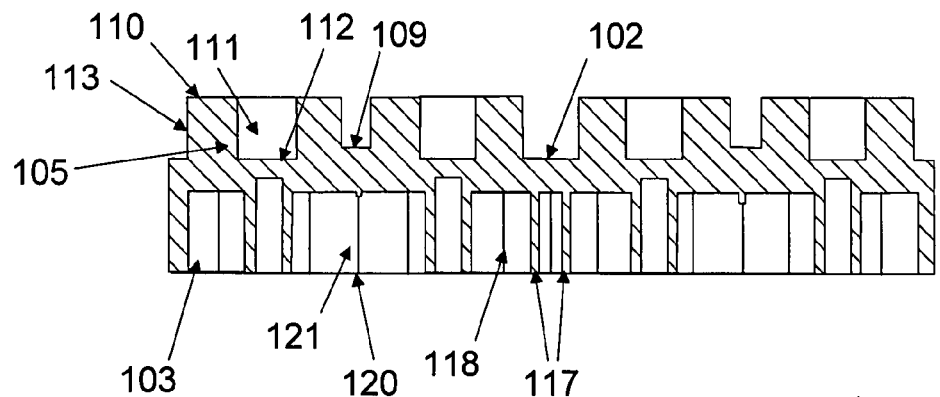
FIG. 6 is a cross section 125 of FIG. 4.
Figure 7:
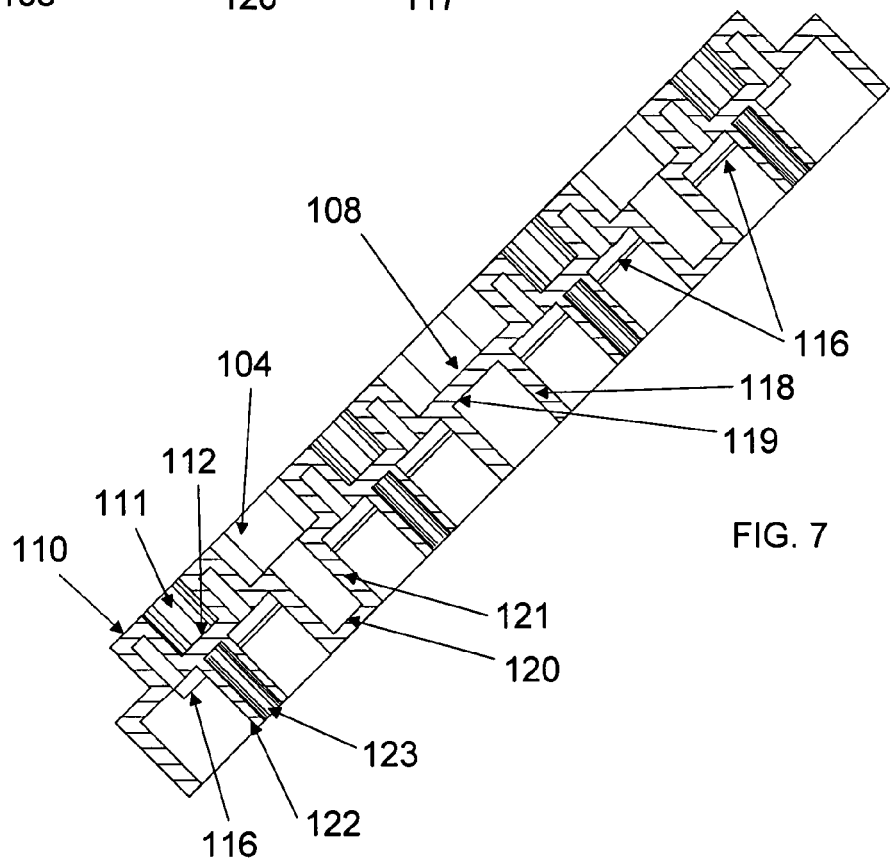
FIG. 7 is a cross section 124 of FIG. 4.

FIG. 2 shows that block 100 comprises a square floor plate 102 whose from periphery extends uniformly downward to a first height an outer sidewall 101 (having optional support notches 103), thereby forming a underside cavity and whereby a lower rim of the outer sidewall defines a ground plane level. Extending down from an underside of the floor plate 102 to the ground plane in a central portion of the square floor plate are four central support sidewalls 118 open at the bottom forming a central support square 119, which define a central underside cavity where each vertex of central support square 119 is directed at an inner midpoint of one of the outer sidewalls 101. The underside cavity is further divided by a paired sets of support flanges 117 which extend from said midpoints to vertices of said central support square 119, further thereby defining four equal sized and generally square receiving cavities for receiving connector sets 106 (shown in FIG. 1).

Referring again to FIG. 2, each paired set of support flanges 117 extends from an underside of the floor plate 102 to the ground plane level and is bisected by a square cross-section side peripheral support 114a extending down from the floor plate 102 to the ground plane and under the portion of the floor plate 102 where side square peripheral cavities 107 (in FIG. 1) are located. Two opposite vertices of each side peripheral support 114a are connected with one of the support flanges 117.

The underside cavity beneath the floor plate 102 comprises bridge flanges 116 connecting sides of all the downward extensions from the floor plate 102. Said bridge flanges 116 extend from the underside of the floor plate 102 to a depth of one half or less of the distance from the underside of the floor plate 102 to the ground plane.

FIGS. 3, 4, 5, 6 and 7 show the above features in other views.

Figure 8:
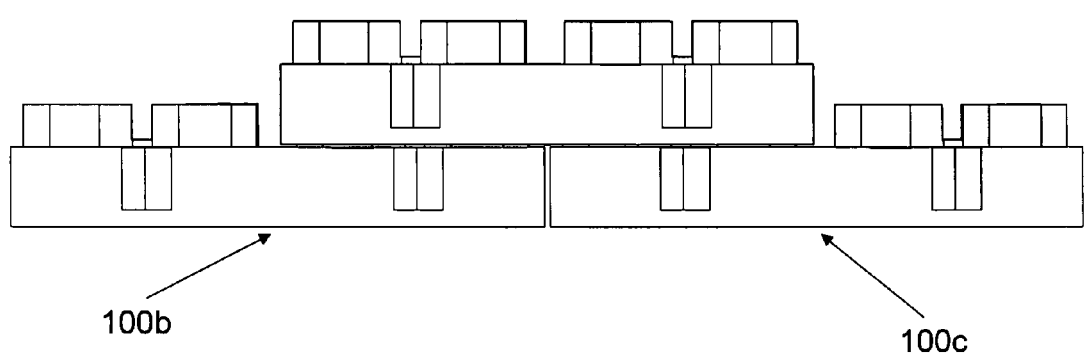
FIG. 8 shows three blocks as shown in FIG. 5 in a stacked configuration.

FIG. 8 shows blocks 100a, 100b and 100c interlocked with connectors of blocks 100b and 100c secured in the structure of the cavity under the floor plate of block 100a. Blocks 100b and 100c are first arranged abutting one another along adjacent sides of their outer sidewalls. Block 100a is impressed upon the tops of blocks 100b and 100c.

Figure 9:
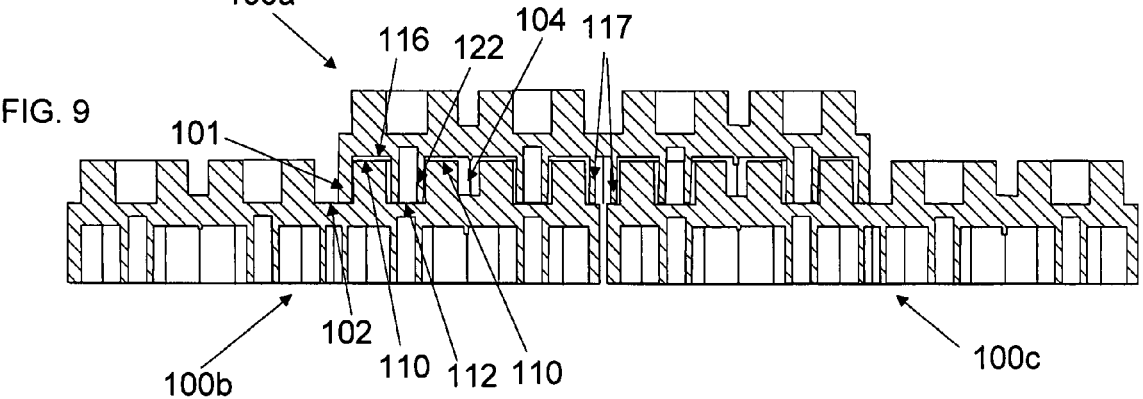
FIG. 9 shows three blocks as shown in FIG. 6 in a stacked configuration.

FIG. 9 shows a cutaway view of the assembly of FIG. 8, where bridging flanges 116 of block 100a are supported from the top surfaces 110 of the connectors of blocks 100b and 100c. In addition, the cylindrical pins with sidewalls 122 are shown supported from closed end 112 of the cylindrical bore of the connectors of blocks 100b and 100c. A portion of the outer sidewalls 101 of block 100a are supported on a portion of the floor plate of blocks 100b and 100c. A part of the support flanges 117 of block 100a are supported from the floor plates of blocks 100b and 100c. For each of one of the adjacent connector sets on the tops of blocks 100b and 100c, a row of two corner peripheral supports 114 and a side peripheral support 114a extending from the underside of block 100a are secured within, respectively, two corner peripheral receiving cavities 104 and one side peripheral receiving cavity 107. Finally, the bottom edges of sidewalls 118 of central support square 119 and support flanges 117 of block 100a are supported from the floor plates 102 of both blocks 100b and 100c.

Therefore, block 100a is connected to block 100b by way of the extensions of eight cylindrical pins, four connectors and three peripheral connectors, which is also true of the connection with block 100c. The central support square, support flanges and bridge flanges are all supported on flat top surfaces of both blocks 100b and 100c. This type of connection is very strong and secure.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A square leveler block formed in a single and unitary molding step of a polymer resin comprising:
   (a) a square floor plate whose from periphery extends uniformly downward to a first height outer sidewalls, thereby forming an underside cavity and whereby a lower rim of the outer sidewall defines a ground plane;
   (b) a central support square extending from the underside of the floor plate to the ground plane and located in a central part of the floor plate so that vertices of said central support square are directed to midpoints of the outer sidewalls and between which are located support flanges bisected by side peripheral supports having square cross sections and which extend from an underside of the floor plate to the ground plane and two of whose vertices are connected with said support flanges;
   (c) sixteen octagonal flat-topped connectors extending up from a top side of the floor plate, each define a cylindrical pin bore extending from a top opening to a closed end at the floor plate, where connectors are divided into four connector sets, each connector set having four octagonal connectors adjacently linked by low projections from the floor plate, each set being generally square and arranged at one of four corner portions of the top of the floor plate;
   (d) opposing and center facing sides of the octagonal connectors in a connector set are parallel, thereby defining in a central part of the connector set a square corner peripheral receiving cavity;
   (e) opposing and center facing sides of four central-most connectors of the four connector sets are parallel and define a square central receiving cavity;
   (f) opposing and center facing sides of the four connectors of two adjacent connector sets are parallel and define a square side peripheral receiving cavity;
   (g) from the underside of each said pin bore's closed end to the ground plane extends a pin cylinder, said cylinder having a diameter less than a diameter of said pin bore;
   (h) from the underside of a part of the floor plate of each corner peripheral receiving cavity to the ground plane extend corner peripheral supports having square cross sections and two of whose vertices are aligned with vertices of adjacent side peripheral supports; and
   (i) bridge flanges extending less than halfway from the underside of the floor plate to the ground plane and supportively connecting all elements extending down from the underside of the floor plate.

2. The block of claim 1 wherein the blocks are formed of a polymer from among the group consisting of polyethylene, polypropylene, and polystyrene.

3. The block of claim 1 wherein the central support square is adapted to be engaged in either of the square central receiving cavity or the side peripheral receiving cavity.

4. The block of claim 1 wherein a square opening is defined in the floor plate at a bottom of each corner peripheral receiving cavity from which extends down to the ground plane four walls which end in a bottom plate, the combination of the four walls and bottom plate thereby forming square cross-section corner peripheral support.

5. The block of claim 4 wherein a square opening is defined in the floor plate at a bottom of each side peripheral receiving cavity from which extends down to the ground plane four walls which end in a bottom plate, the combination of the four walls and bottom plate thereby forming the square cross-section side peripheral support.

\* \* \* \* \*